United States Patent [19]

Crowle

[11] Patent Number: 4,843,613

[45] Date of Patent: Jun. 27, 1989

[54] DIGITALLY IMPLEMENTED MODULATORS

[75] Inventor: Brian Crowle, Oakley, England

[73] Assignee: Digital Equipment Corporation, Maynard, Mass.

[21] Appl. No.: 826,700

[22] Filed: Feb. 6, 1986

[30] Foreign Application Priority Data

Mar. 4, 1985 [GB] United Kingdom ................. 8505527

[51] Int. Cl.[4] ............................................. H04L 27/20
[52] U.S. Cl. ...................................... 375/59; 332/9 R; 332/16 R; 375/62; 375/67
[58] Field of Search ............................. 375/39, 61–62, 375/67, 59–60; 328/14; 364/721; 332/9 R–16 R; 370/110.2

[56] References Cited

U.S. PATENT DOCUMENTS

| | | | |
|---|---|---|---|
| 3,955,141 | 5/1976 | Lyon et al. ........................... | 375/39 |
| 4,003,001 | 1/1977 | Jones, Jr. .............................. | 375/67 |
| 4,263,670 | 4/1981 | Sherman .............................. | 375/67 |
| 4,315,319 | 2/1982 | White .................................. | 375/12 |
| 4,390,754 | 6/1983 | Holberg ......................... | 179/84 UF |
| 4,498,171 | 2/1985 | Munter et al. ................... | 370/110.2 |
| 4,613,976 | 9/1986 | Sewerinson et al. ................. | 375/54 |
| 4,617,535 | 10/1986 | Underdem ........................ | 332/16 R |

OTHER PUBLICATIONS

"Microprocessor Implementation of High-Speed Data Modems", IEEE Trans. Commun., vol. No. 2, 1977.
Published Internationl Patent Application, WO/85/0025, Wolfdata, Inc., Published Jan. 17, 1985.
Published Internationl Patent Application, WO/81/00334, Western Electric Company Inc., Published, Feb. 5, 1981.

*Primary Examiner*—Benedict V. Safourek
*Attorney, Agent, or Firm*—Michael N. Meller

[57] ABSTRACT

A digitally implemented modulator for generating samples of a band-limited modulated output signal from an inputted binary data signal made up of a train of sets of data bits. Samples values are stored in look-up tables incorporated in a microprocessor. The look-up tables are accessed by forming an address for each of three sets of data bits in a sequence. Each address is dependent on the binary values of the data bits of the respective set of inputted binary data and on the number of samples formed since the start of the pending band interval. A predetermined number of samples are generated per set of inputted binary data. The respective sample values stored in the look-up tables at the three addresses formed are summed to form the sample of the band-limited modulated output signal.

16 Claims, 5 Drawing Sheets

DIGITALLY IMPLEMENTED MODULATORS

BACKGROUND OF INVENTION

1. Field of the Invention

This invention relates to digitally implemented modulators which are employed to provide a bandlimiting function upon a binary input sequence.

2. Description of the Prior Art

Digitally implemented modulators are illustrated in the article, "Microprocessor implementation of high-speed modems", IEEE Trans Commun. Vol. COM-25, Feb. 1977. For example, they may comprise a coder for converting a binary input sequence, of a predetermined length, representing a series of symbols, into two output pulse trains by a coding rule. The two output pulse trains of the coder are then applied to respective, identical, digital finite impulse response low-pass filters. The outputs of the filters are a pair of signals which are modulated by a pair of respective digital modulators. The modulators multiply the filter outputs by samples of sine and cosine signals. The resulting products are summed to yield the digital output of the modulator. This gives a suitable modulated analog signal for transmission after digital-to-analog conversion and simple low-pass filtering.

The above article discloses a microprocessor implementation of a digital transversal filter. ROM is used to store the filter coefficients and RAM is used to store input samples for multiplication by the coefficients. The microprocessor provides the necessary multiplication and addition functions to provide a filtered output signal.

A known method for simplifying the multiplication step is to store, in a look-up table, all possible outputs of the modulator. The input symbols are used to address the look-up table to provide the modulated output. To implement a digital filter using this look-up table approach, a software model, running on a large computer, is used to generate the required output samples for all possible combinations of input symbols. Because the look-up table must be finite in extent, the filter responses to given inputs must also be finite. This naturally leads to the use of the Finite Impulse Response (FIR) type of digital filter which meets this requirement.

This type of FIR filter may be visualized as a tapped delay line, employing a series of shift registers coupled together and having output "taps" for outputting data stored in each shift register. To keep the look-up table as small as possible, the number of taps must be kept as small as possible. Design analysis shows that 25 taps is about the minimum number which will give the required performance for both passband and stopband filters. Additionally, to keep the look-up table size down, the sampling rate used by the filter must be kept as low as possible. The limiting factor is the Nyquist criterion, in which the sampling rate must be at least twice the maximum frequency handled by the filter. The present invention provides for a maximum frequency of about 3 kHz.

The size of a look up table required for a digital filter representing a tapped delay line having 25 taps, a sampling frequency of 7.2 kHz, a Nyquist frequency of 3.6 kHz and a baud rate of 600 Hz can be calculated mathematically. Given that 600 symbols are processed per second (baud rate of 600 Hz), 12 output samples are required for each symbol, and the filter will be working on the data from 3 input symbols at any one time, the calculations are as follows: (1) Each symbol is represented by a 4 bit binary number, thus giving 16 possible inputs to the filter; (2) 3 symbols are processed at one time, therefore, the filter processes $16 \times 16 \times 16$ combinations of inputs, or 4096 combinations, each represented by an 8 bit byte, and (3) there are 12 samples to be stored for each of these, so $12 \times 4096$ or 49,152 bytes of storage are required. This equates to 393,216 bits of storage. Since the modem of the present invention uses two distinct frequency bands to transmit on, two such tables are required, so that 98,304 bytes, or 786,432 bits of storage are required to implement a complete set of tables for the transmitter. This represents a large storage requirement for a small system such as a modem.

By contrast, the present invention generates final modulated waveforms by using a look-up table in which samples of components of such waveforms are stored, and in which, 3 numbers taken from the look-up table are added together, the sum being the current output sample.

SUMMARY OF INVENTION

A digital modulator embodied in accordance with the invention employs a memory for storing a look-up table of digital values representing components of an input digital data stream and memory addressing means, responsive to the input digital data stream, for addressing the look-up table so that a series of the component digital values may be outputted. The modulator also includes means for adding selected ones of the outputted series of component digital values to provide a sequence of digital values defining a bandlimited modulated signal corresponding to a filtered and modulated form of the input data stream.

In the prior art device, the microprocessor, responsive to an input symbol, looks up one digital value in a very large look-up table, and uses this directly as the output sample. The memory requirements for storing such a table are substantial in terms of both cost of components and board space. In the present invention, the microprocessor adds together 3 component digital values taken from a much smaller look-up table to generate the current output sample. The actual reduction in memory requirement achieved by the invention over the prior art is nearly two orders of magnitude, from 98,304 bytes to 1152 bytes. This makes the look-up table approach, in which component digital values are stored, commercially attractive.

The invention provides for large memory reductions by taking advantage of the constancy of the transmitted symbol during the baud interval. Each transmitted symbol has real and imaginary components X and Y, respectfully, and can be represented by an equation comprising these two components. As these two components are constant over the baud interval, the equation can be reduced. An important aspect of this invention is therefore the recognition of the possibilities of this grouping, and the implementation of the means for taking advantage of it.

Furthermore, the invention utilizes the constancy of the phase relationship between the modulating waveforms (sine and cosine) and the time which has elapsed since the beginning of the last baud interval. Since the carrier frequencies are 1200 and 2400 Hz, there are exactly two cycles of the 1200 Hz and four cycles of the 2400 Hz carrier in each of the 600 baud time slots. The modulation process is always the same for each baud, and can therefore be done in advance and stored in the look-up table without increasing its size.

According to another aspect of the present invention, there is provided a device for generating a bandlimited modulated signal from incoming binary data. The device forms the data into a number of groups of bits, and encodes each group of bits into pairs of x and y values. Each pair of these values is representative of an amplitude and a phase of the incoming data. The device then stores a sequence of m (where m is preferably 3) pairs of respective x and y values, and then determines the position, in time, of a sample of the bandlimited modulated signal. The position of the signal is taken with reference to the moment in time when it is required to send a new group of bits from the incoming binary data stream. A reference table, or look-up table, which can be accessed in accordance with the position and the stored sequence of m pairs of x and y values, is employed for generating a set of m component waveform sample values. One component waveform sample value is generated for each pair, and which, when they are summed, represents a sample of the bandlimited modulated signal corresponding to the current set of m pairs.

The sets of component waveform sample values which are stored in the foregoing reference table may be generated by using a digital filter having two memories (x, y) in which each has a plurality of storage locations for storing values related to the amplitudes of the incoming binary data pulses. The number of storage locations depends on the number of pulses to be accommodated in each memory and on the number of samples required to reconstruct a cycle of the filtered, modulated signal. Each storage location employs multiplication means for multiplying the value in each location by a factor particular to that location. The quantities in the reference table may be calculated, for each clock cycle, by summing those factors (phase) relating to the location in which the value of the same pulse is stored, multiplying the sum by that value and by the cosine (for the y) or sine (for the x) component of a desired carrier wave of the modulated signal. The modulated sum of the products thus obtained for each pulse in the stores represents a sample of the modulated signal. Modulated sums, for an array of signals, are stored in the reference table so that the inputted wave can be provided in a bandlimited form.

The invention is pointed out with particularity in the appended claims and may better be understood by referring to the following detailed description taken in conjunction with the accompanying drawings.

DESCRIPTION OF THE PREFERRED EMBODIMENT

The invention is a digital modulator, implemented by a microprocessor, which employs a digital memory for storing component digital values representing discrete samples of an input wave form. The memory address at which each component digital value is stored is directly related to the phase of the required sample. The memory is in the form of a "look-up table" which can easily be accessed by a microprocessor or other hardware devices. A sinusoidal "carrier" wave is created by digital to analog (D/A) conversion as samples are accessed from such a table at regular intervals and with a constant increment of phase. The spectrum of such a wave comprises a pure tone at a frequency equal to the rate of change of the phase of the address plus other component frequencies.

Producing phase modulation from the look-up table is straightforward as the address of each sample is related to its phase. The addressing of the table results in a phase modulated waveform having discontinuities where phase changes occur. The number of entries or samples required for this table is equal to the desired number of samples needed to construct the input signal within a given baud interval. This number would normally be a small integer, for example, 12.

Figure 1:
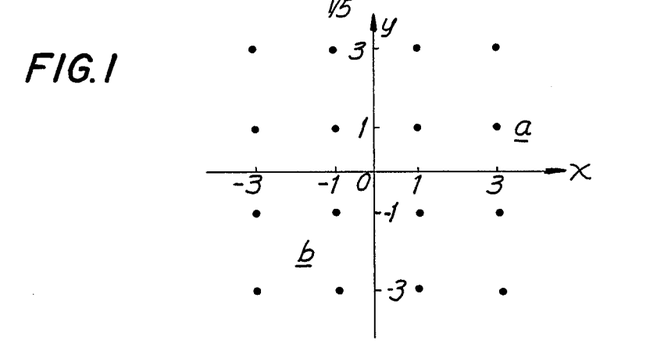
FIG. 1 is a diagram of an x, y map illustrating 4×4 Quadrature Amplitude Modulation (QAM)
Figure 2:
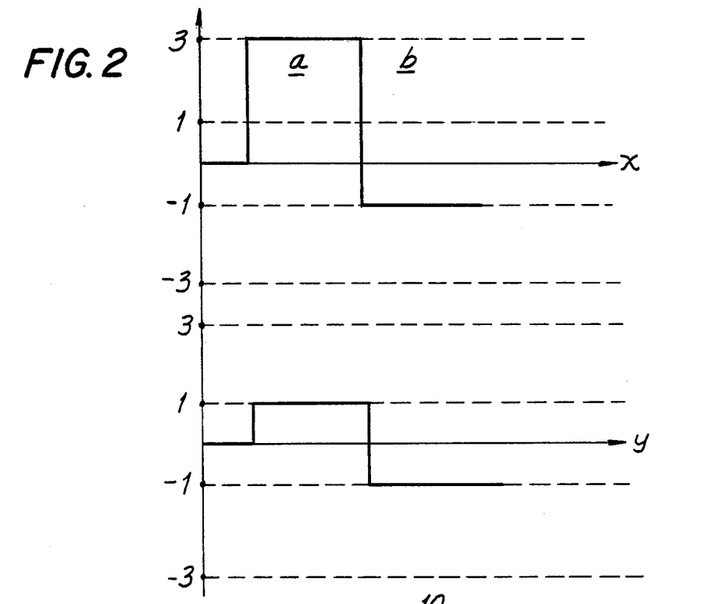
FIG. 2 is an illustration of a waveform corresponding to the x, y output set forth in FIG. 1.

In the field of synchronous data transmission over voice grade telephone channels at high speeds, complex modulation schemes are often used. In a typical transmission system, the incoming binary data is normally divided into groups of 4 bits (quad-bits), wherein, each such group is a symbol, and, one symbol is transmitted over each baud interval. The data is encoded so that each 4 bit binary sequence gives rise to a unique signal in the x,y (phase, quadrature) plane. As an illustration, for 4×4 quadrature amplitude modulation (QAM) each of x and y can take one of the following values: $-3, -1, 1, 3$. FIG. 1 illustrates the 16 possible combinations or points (symbols) on the x-y map. Each symbol represents one particular combination of 4 bits. One symbol is sent per baud interval. The symbol can originate as two sets of x and y bits having the particular value given on the x, y axes. That is, for the symbols marked a, b in FIG. 1, the waveforms shown in FIG. 2 would be produced. The present invention employs this type of modulation.

As there are 16 possible symbols to be transmitted, the size of the look up table required is equal to (number of samples per baud) x (number of possible symbols) or, for the numbers being considered, 12 samples × 16 symbols = 192 entries in the look up table. Each entry in the table is a numerical quantity, not a single bit, and the precision with which this quantity is stored directly affects the performance of the modulator in terms of residual "quantising" noise when the signal is converted to analog form. For voiceband modem applications, the minimum precision required is about 8 bits (a convenient industry standard). The memory requirement for an 8 bit word would therefore be 8×192, or 1536 bits.

If phase changes, resulting from incoming binary data, occur pseudorandomly, the spectrum of the resulting waveform in the analog domain consists of a lobe centered on the carrier frequency, wherein, the lobe has a bandwidth at least equal to the baud rate (600 Hz is considered here). In most cases the bandwidth will be slightly greater; for example, for an output signal centered on a frequency of 2,400 Hz, the bandwidth may be almost 800 Hz. However, in addition to the central lobe, there are sidelobes similar in shape to the central lobe but having a lower amplitude. For Frequency Division Multiplexing applications, where a received signal and a transmitted signal are passed down the same transmission channel, two carrier frequencies are used. Since the received signal may be weak, it is important to remove the side lobes of the transmitted signal, thus preventing them from interfering with the desired carrier frequency. That is, the transmitted signal should be bandlimited.

The simplified look-up table approach of the invention can be extended to take into account the bandlimiting of the signal as well as simple modulation. In a bandlimited, modulated signal, the signal amplitude at any instant is determined not only by the symbol being sent in the current baud interval, but also by symbols sent in previous baud intervals. The more baud intervals which are taken into account in this determination, the better will be the bandlimiting. An unsimplified look-up table designed to produce a modulated, bandlimited, signal must therefore contain entries relating to all possible combinations of symbols over the minimum baud range consistent with the bandlimiting required. This range normally contains at least three baud intervals for which the memory requirement would be 393,216 bits. This is very large, even with current high density memory technology.

Figure 3:
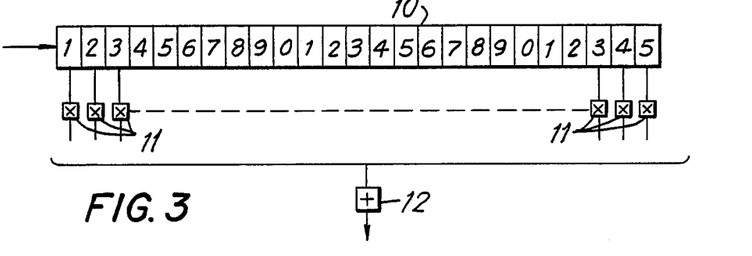
FIG. 3 represents a tapped delay line or digital filter for use in the present invention.

FIG. 3 shows diagrammatically a known Finite Impulse Response filter having a tapped delay line 10, into which symbols representative of each baud interval are clocked. A software program, running on a computer, is employed for modeling this filter and for generating component sample values for storage in the look-up table. The following description of this filter is necessary to illustrate how a simplified software model can be prepared to generate the component sample values.

Sections 1 2 3 4 5 6 7 ... represent individual two bit memory locations in which input values are stored. As described earlier, these values can be −1, 1, 3 or −3. The symbols are clocked through the filter to the right, moving one section at each clock pulse. A new value is entered at the far left as the oldest value is lost at the far right. On the basis that twelve samples are to be provided for each baud interval, a 25 tap filter, as illustrated, will accommodate 3 symbols.

The prior art filter operates by taking, at each clock interval, each of the stored values, multiplying it by a constant at the corresponding tap 11, and summing the results at 12. The complete sum is the convolution output of the filter 10. An understanding of the prior art filter is necessary for an understanding of the simplified look-up table approach which models this prior art filter.

The actual multiplication constants of the taps 11 of the digital filter 10 are normally generated by computer program and are dependent on the specification of the desired frequency response of the filter. Although not discussed here and not part of the present invention, it is convenient, when preparing look-up tables, for a microprocessor to have programs available both to determine the tap values and also to simulate the operation of the filter for each possible combination of sample values. These simulated outputs form the data which is stored in the memory look-up table of the present invention.

Figure 4:
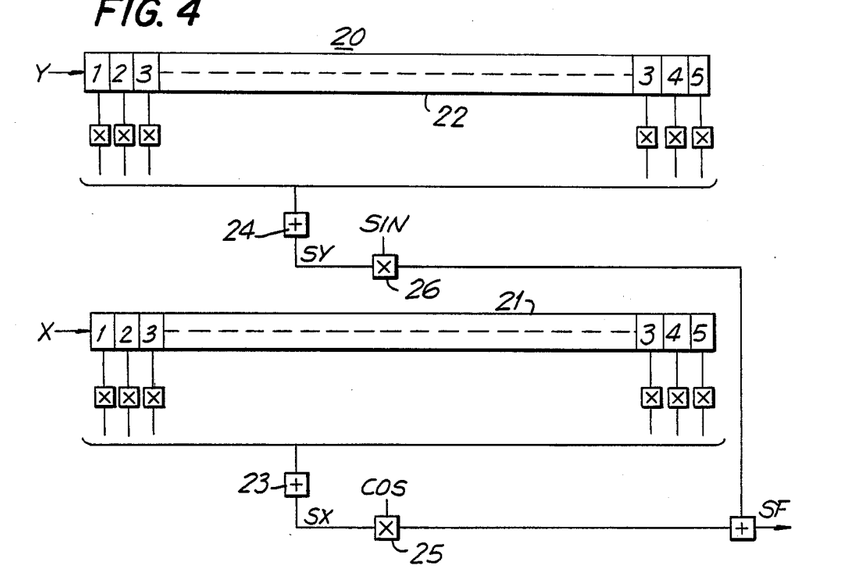
FIG. 4 represents a transmitter using the filter of FIG. 3.

Two such filters can be combined to form a complete transmitter 20, as illustrated in FIG. 4, for transmitting x and y components of the input symbols.

In transmitter 20, X and Y represent the real and imaginary (sometimes called Phase and Quadrature) components of the baseband symbol which is being transmitted. As described earlier, X and Y take on one of four discrete values which remains constant throughout each baud interval.

As the four levels can be considered to be decoded from the four bits of information contained in each baud interval, the incoming data can be considered to be divided between X and Y inputs to the filters 21 and 22, respectively.

In order to obtain a modulated bandlimited output signal (summed y and x) using the transmitter, it is necessary to sum, at 24 and 23, the values in each section, weighted by the multiplication constants of the taps 11. These must then be multiplied by the modulating signals sin wtat and cos wtat, at multipliers 25 and 26, respectively, with w being the transmission frequency. The transmission frequency is one of two standard values, 1200 Hz or 2400 Hz. Finally, the modulated x and y outputs must be added together. This prior art technique requires that this sequence of events is carried out for each clock interval, thus requiring a very fast microprocessor operating time.

The present invention employs a look-up table for modeling this type of prior art filter. The look up table can be accessed by incoming data to produce the required output sample as described earlier with reference to simple phase modulation. The invention is a method which is best expressed as a mathematical model of the filter illustrated in FIGS. 3 and 4. By expressing the filter mathematically, it is possible to illustrate how the filter can be simplified. The tap 11 multiplication constants of the filter are defined as $c(i)$ ($i=1$ to 25). Consider the expression for the output SX of "x" filter 21, r clock intervals after a baud boundary, where r can have the values 1 to 12:

$$SX = \sum_{i=1}^{r} (c(i) \cdot x(2)) + \sum_{i=r+1}^{r+12} (c(i) \cdot x(1)) + \sum_{i=13}^{25} (c(i) \cdot x(0)) \qquad \text{Eq. I}$$

where the sigma's represent summation over the indicated range of i, and the quantities $x(0)$, $x(1)$, $x(2)$ are the numerical values $(-1, 1, +3, -3)$ representing the x coordinate of symbols 0, 1, 2 in the filter.

Equation I can be rewritten as:
$$SX = d(r) \cdot x(2) + e(r) \cdot x(1) + f(r) \cdot x(0) \qquad \text{Eq. II}$$

where $$d(r) = \sum_{i=1}^{r} c(i)$$

Here, the coefficients $c(i)$ themselves have been summed taking advantage of the fact that the data in the filter does not change in value during each baud interval.

Similar expressions hold for $e(r)$ and $f(r)$. There need only be considered 12 values for d,e,f since, on the 13th clock shift, a new symbol moves into the filter and the subscripts of x in Equation I are all incremented.

Since the "y" filter 10a is identical to "x" filter 10b, its output is given by
$$SY = d(r) \cdot y(2) + e(r) \cdot y(1) + f(r) \cdot y(0) \qquad \text{Eq. III}$$

where $d(r)$, $e(r)$, $f(r)$ are the same as before.

In the modulation and summation steps, the baseband values SY and SX, from the filters, are multiplied by sine and cosine components, defined as q(r), p(r) at the desired carrier frequency. The final filtered, modulated and summed output SF is given by $$SF = p(r) \cdot SX + q(r) \cdot SY \qquad \text{Eq. IV}$$

Substitution of Equations II and III in Equation IV gives $$SF = p(r) \cdot [d(r) \cdot x(2) + e(r) \cdot x(1) + f(r) \cdot x(0)] +$$

$$q(r) \cdot [d(r) \cdot y(2) + e(r) \cdot y(1) + f(r) \cdot y(0)].$$

Multiplying this out gives a series of product terms of the form $p(r) \cdot d(r) \cdot x(2)$. This gives rise to a new set of coefficients kn(r) so that SF can be expressed as follows:

$$SF = k1(r) \cdot x(2) + k2(r) \cdot x(1) + \ldots + k6(r) \cdot y(0) \qquad \text{Eq. V}$$

Again, the coefficients $(p(r) \cdot d(r)$, etc.) have been combined, taking advantage of the constancy of x(n) and y(n) over the baud interval.

Now each coefficient kn(r) has 12 values as there are only 12 values of r which need to be taken into account. The quantities x(n) and y(n) have 4 possible values, and n=1 to 6. Hence, a look-up table of $6 \times 12 \times 4 = 288$ entries allows the final modulated carrier to be obtained from 6 recall/accumulate operations.

The foregoing method for reducing the memory requirements of the look-up table takes advantage of constancy of the transmitted symbol during the baud interval. The invention also takes advantage of the constancy of the phase relationship between the modulating waveforms (sine and cosine) and the time which has elapsed since the beginning of the last baud interval. Since the carrier frequencies are 1200 and 2400 Hz, there are exactly two cycles of the 1200 Hz and four cycles of the 2400 Hz carrier in each of the 600 baud time slots. The arithmetic of the modulation process is always the same for each baud, and is done in advance and stored in the look-up table without increasing its size. Therefore, the invention recognizes the possibility of this simplified grouping and the means for employing it.

Thus, the look-up table is reduced to quite manageable proportions. However, the 6 recall/accumulate operations may take a significant length of time to perform. Where desired, the performance time may be further reduced by combining the x's and y's in pairs, thus providing:

$$SF = [k1(r) \cdot x(2) + k4(r) \cdot y(2)] + [k2(r) \cdot x(1) + k5(r) \cdot y(1)] +$$

$$[k3(r) \cdot x(0) + k6(r) \cdot y(0)]$$

Now only 3 recall/accumulate operations are required, but the storage capability is increased to 516 bytes as there are $12 \times 16$ bytes in each bracketed term, and there are terms for a total of 576 bytes. For a 2 channel FDM modem this represents a good compromise between execution time and bulk memory storage.

Finally, a modem in accordance with the above embodiments may comprise a microprocessor with ROM (containing the look up table) and RAM, means for coupling the microprocessor to a communication channel, means for providing digital-to-analogue conversion of the output data and means for coupling to the microprocessor an input digital data stream to be modulated.

Figure 5A:
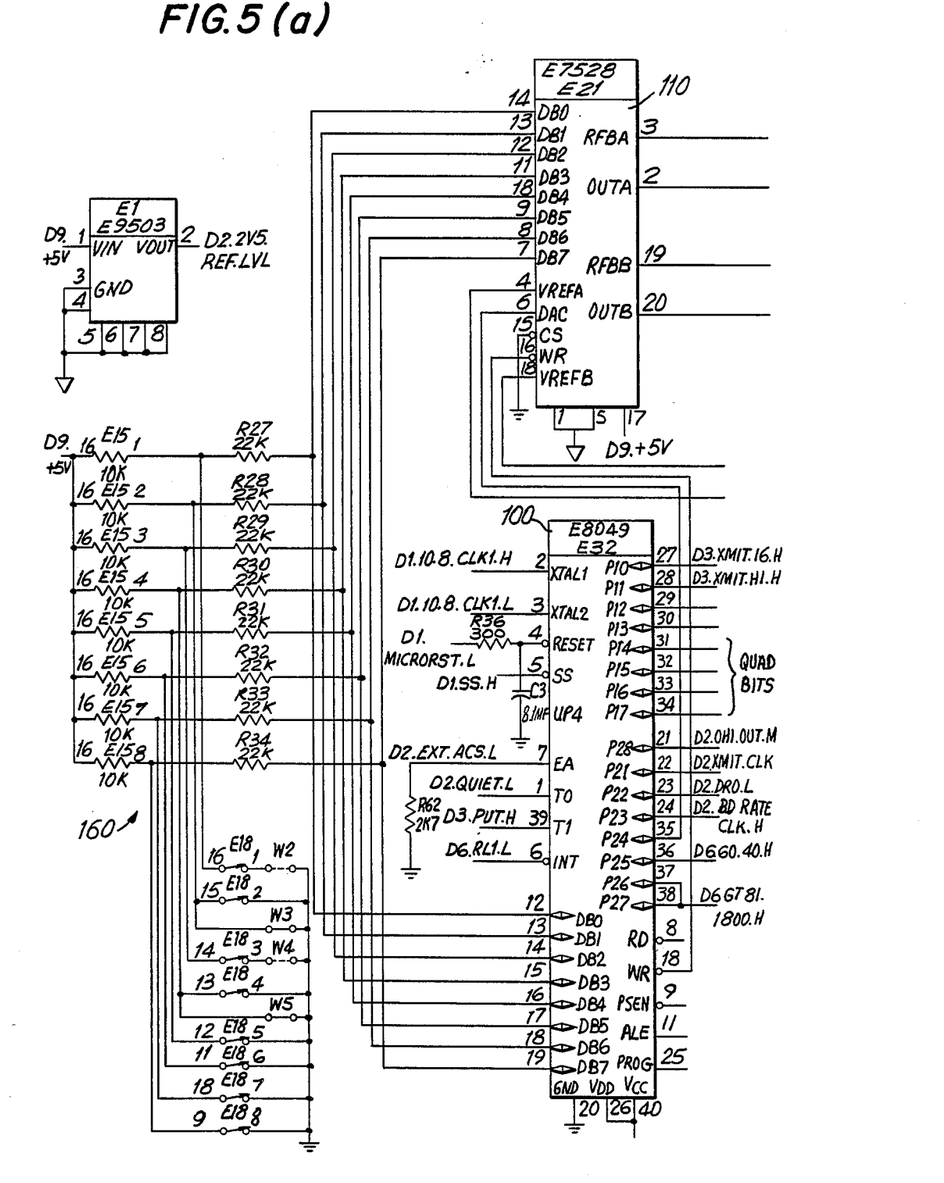
FIG. 5 is a circuit diagram of the preferred embodiment of the invention.
Figure 5B:
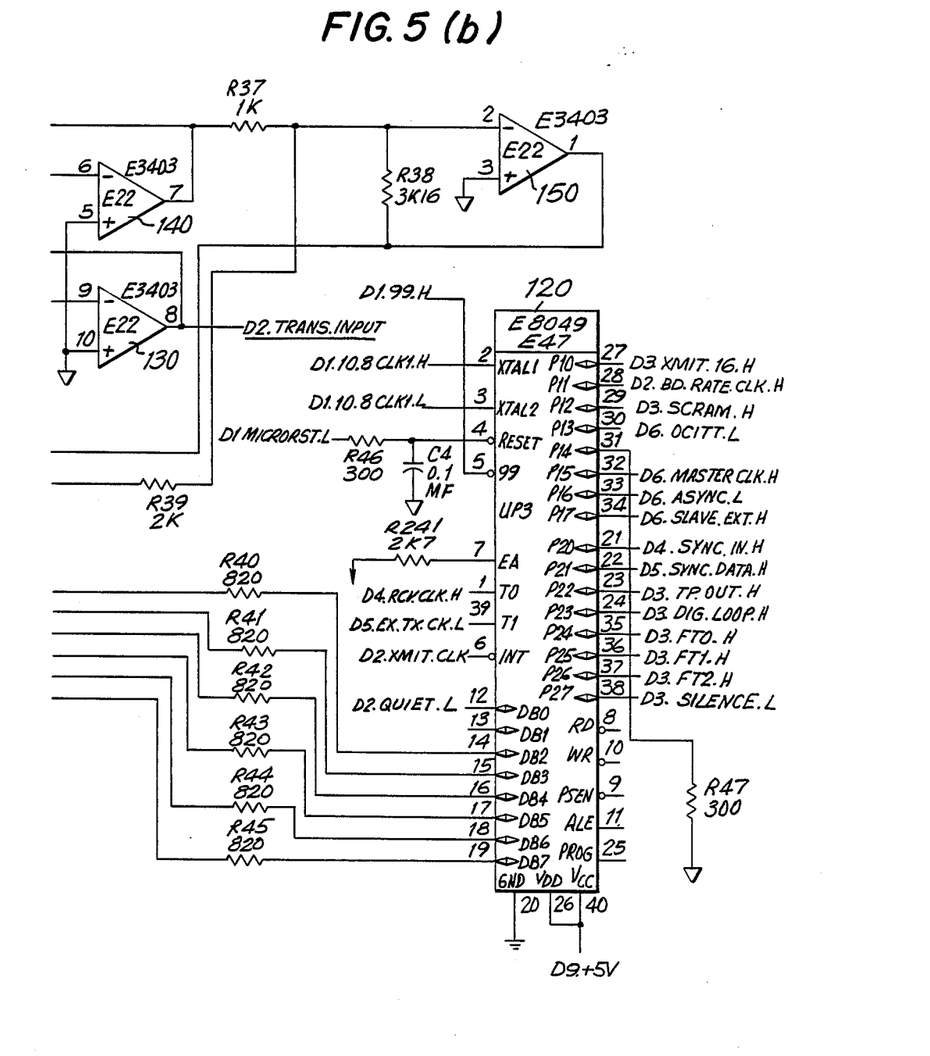

FIG. 5 discloses a circuit diagram of the preferred embodiment of the invention.

The preferred embodiment of the invention is implemented in a 2 channel Frequency Division Multiplexing (FDM) modem and employs a conventional INTEL 80C49 type microprocessor (100), together with a digital to analog converter (110) as set forth in FIG. 5.

The INTEL 80C49 is particularly suited to the purpose of the invention. It contains within a single integrated circuit all the processing power, ROM and RAM required to take the binary input to the modulation process and produce the digitally encoded output bytes which comprise the modulated, bandlimited output waveform.

The 80C49 has a program memory which is 2048 bytes in size and organized in 8 pages of 256 bytes. Within each page, look-up tables can readily be constructed. Tables covering more than one page in extent are much more difficult to implement. However, the techniques described in this invention lend themselves readily to the use of 256 byte pages, so this particular limitation of the 80C49 is not a problem.

To see why this is so, consider again the equation for the output sample SF:

$$SF = [k1(r) \cdot x(2) + k4(r) \cdot y(2)] +$$

$$\{k2(r) \cdot x(1) + k5(r) \cdot y(1)\} + \{k3(r) \cdot x(0) + k6(r) \cdot y(0)\}$$

For each of the terms in braces { }, there are 12 possible values for r, corresponding to the 12 sampling instants of the output waveform, and 16 possible combinations of the pairs of bits represented by the x and y terms. Thus each term can be found using a look-up table of $12 \times 16$ bytes i.e. 192 bytes. This provides for the construction of multiple pages of ROM containing 192 bytes of look-up table and up to 64 bytes of program code. Three (3) such pages of ROM are required to implement the equation for SF: each page contains the appropriate table of 192 bytes together with executable code.

The executable code on each page acts as follows:
1. calculates the address of the required byte from the table
2. looks up the byte
3. adds the byte to the current subtotal for the quantity SF
4. jumps to the appropriate location on the next page.

This is repeated for each of the 3 pages, resulting in the complete calculation of SF.

Figure 6:
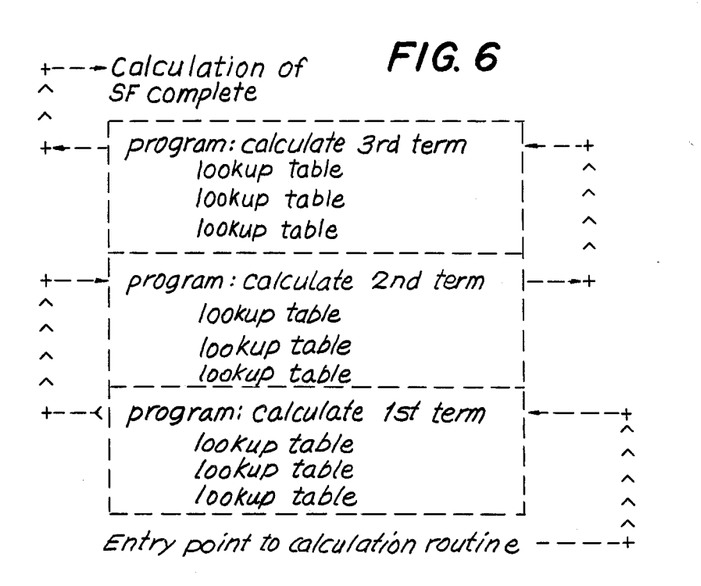
FIG. 6 is a flow diagram of the program memory.
Figure 7:
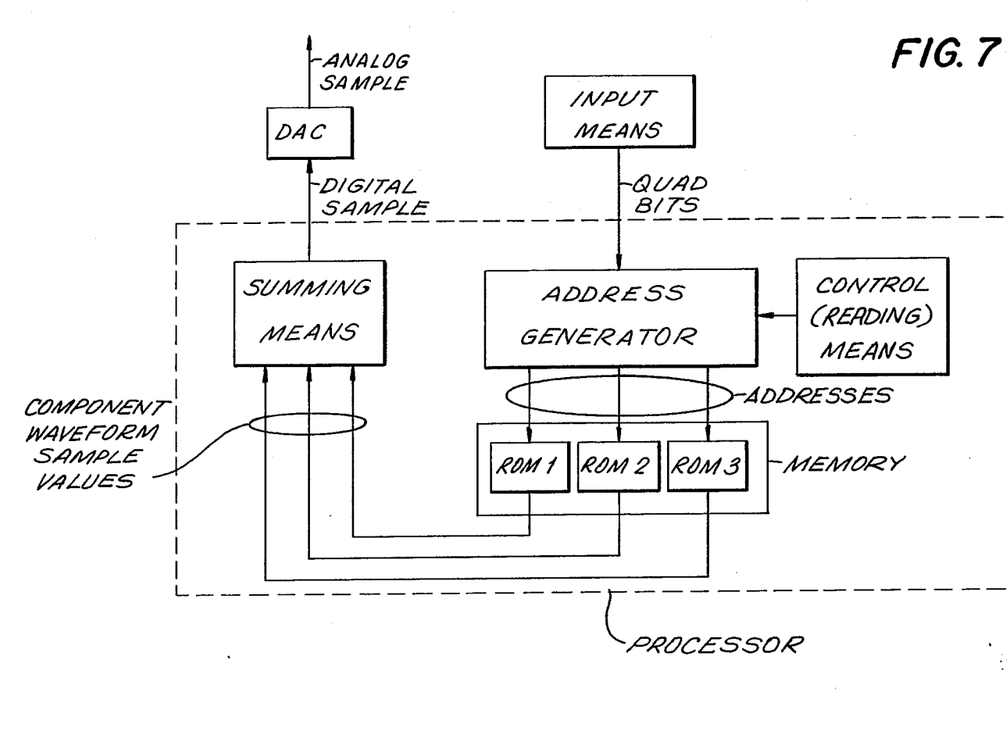
FIG. 7 is a block diagram of processor 100 of FIG. 5.

This process is illustrated in FIG. 6 in which the program flow through 3 pages of program memory is shown.

This code is actually executed as a subroutine. For each consecutive output sample, the subroutine is called once. SF is calculated as described above. The value of 'r' in the equation is then incremented by one, so that next time the subroutine is called, new locations in the look-up table will be accessed which correspond to the output required at the next sampling instant. The processor then writes the value SF to the digital to analog converter, and returns to the main program.

The addressing of the look-up table is done as follows. An address byte is calculated with the following format:

1. Bits 3–0 are set to yyxx, the value of the quadbit currently being considered (i.e., the values of x and y in the terms enclosed in braces in the equation for SF).

2. Bits 7–4 comprise the 4 bit value rrrr specifying one of the 12 locations within each block corresponding to the number of samples which have elapsed since the start of the baud interval. The decimal value of this is maintained within the range 11 to 0, and corresponds to the value of the 'r' in the equation of SF.

The memory within each page is organized as follows:

1. Lines 192–255: program code
2. Lines 0,16,32, ..., 176: 12 filter output values for consecutive samples corresponding to the code 0000 (binary) for rrrr
3. Lines 1,17,33, ..., 177: 12 filter output values for consecutive samples corresponding to the code 0001 (binary) for rrrr and so on, covering all the combinations of rrrr.

The DF124 modem needs to be able to transmit using either a 1200 Hz carrier frequency or a 2400 Hz carrier frequency. This means that two look-up tables are required for the modulator. This is still within the capability of the 80C49 type microprocessor (100), the pages of memory being organized as follows:

1. Page 0: program code
2. Pages 1–3: code and look-up tables for a 1200 Hz carrier
3. Pages 4–6: code and look-up tables for a 2400 Hz carrier
4. Page 7: program code Selection of the appropriate baud is done using simple code branching based on the setting of a control bit read by the processor.

The processor does other tasks as well as the one just described, but these lie outside the scope of the invention. The only other relevant task the processor has is the updating of the values of x and y in the equation for SF, which will now be described.

At any one time, the processor has stored in RAM three sets of 4 bits, wherein these 4 bits are defined as quadbits. These represent the three most recent contiguous quadbits from the transmitted data stream. At each baud boundary, a new quadbit becomes available for transmission. The processor then discards the oldest quadbit and stores the new quadbit, shifting the other quadbits in a "first in, first out" manner so that the time relationship between them is unchanged:

| "d"new quadbit arriving |  |
| "c"-most recent quadbit |  |
| "b"-next oldest quadbit | Current quadbit store |
| "a"-oldest quadbit |  |
| becomes |  |
| "d"-most recent quadbit |  |
| "c"-next oldest quadbit | Current quadbit store |
| "b"-oldest quadbit |  |

As illustrated in FIG. 5, the quadbits are received by the processor 100 on the port pins P14–P17 from another processor 120. Selection of the highband or lowband carrier frequency is controlled by the logic state of pin P11 which is read by the processor 100. The remaining pins P10, P12 and P13 of E32 are used for other purposes by the processor and do no concern us here.

The output bytes generated by the processor 100 are placed on the bus port designated DB0–DB7. Under the command of the write pulse designated WR, the byte is written to one half of the dual digital to analog converter 110. After some further processing by the other half of the digital to analog converter (to control the overall amplitude of the signal) the analog output is generated as the signal D2.TRANS.INPUT at the output of the operational amplifier E22.

Thus a complete embodiment of the invention is contained by processor 100, DIA converter 110 and operational amplifier 130 together with a few passive components.

It is also to be understood that the following claims are intended to cover all of the generic and specific features of the invention herein described.

What is claimed as new and desired to be secured by letters patent:

1. A digitally implemented modulator apparatus for generating a band-limited modulated output signal from an inputted binary data signal, said apparatus comprising:
   (a) means for inputting a binary data signal comprising first, second and third sets of data bits in sequence, each set comprising a plurality of data bits which are inputted during respective first, second and third baud intervals;
   (b) means coupled to said inputting means for generating first, second and third addresses in dependence respectively on the binary values of said data bits of said first, second and third sets;
   (c) look-up table memory means coupled to said address generating means and having a multiplicity of sets of digital component waveform sample values stored therein;
   (d) control means coupled to said memory means for retrieving first, second and third digital component waveform sample values respectively stored at said first, second and third addresses in said memory means; and
   (e) means coupled to said memory means for outputting a sum of said first, second and third digital sample values, wherein said sum represents a digital sample of said band-limited modulated output signal.

2. The modulator apparatus as defined in claim 1, wherein said generating means generates said first, second and third addresses in dependence on the number of samples which have been output by said summing means since the start of said third baud interval.

3. The modulator apparatus as defined in claim 2, wherein said memory means comprises first, second and third look-up tables respectively stored in first, second and third ROMs, said first, second and third ROMs being respectively addressed by said first, second and third addresses in sequence.

4. The modulator apparatus as defined in claim 2, wherein each of said addresses and each of said component waveform sample values comprises an eight-bit binary signal.

5. The modulator apparatus as defined in claim 1, further comprising digital-to-analog conversion means for converting said sum to an analog signal.

6. A digitally implemented modulator apparatus for generating a band-limited modulated output signal from an inputted binary data signal, said binary data signal being a train of sets of data bits, each set comprising a plurality of data bits which are inputted during a baud interval, said apparatus comprising memory means having digital sample values stored therein and means for outputting a digital sample of said output signal which is the sum of first, second and third digital sample values retrieved from said memory means, said first, second and third digital sample values being determined in dependence respectively on the binary values of first, second and third consecutive sets of said inputted binary data signal.

7. The modulator as defined in claim 6, wherein said means for outputting a digital sample of said output signal comprises means for generating first, second and third addresses in dependence respectively on the binary values of the data bits of said first, second and third consecutive sets and in dependence on the number of samples which have been output since the start of the pending baud interval, means for storing a multiplicity of sets of digital component waveform sample values, control means coupled to said generating means and said storing means for addressing said memory means with said first, second and third addresses in sequence whereby first, second and third digital component waveform sample values respectively stored at said first, second and third addresses are output from said storing means, and summing means coupled to said storing means for outputting a sum of said first, second and third digital sample values, said sum representing said digital sample of said band-limited modulated output signal.

8. The modulator apparatus as defined in claim 6, further comprising digital-to-analog conversion means for converting said sum to an analog signal.

9. The modulator apparatus as defined in claim 6, wherein said means for outputting a digital sample of said output signal comprises a microprocessor having look-up tables stored therein.

10. A digitally implemented modulator apparatus for generating a band-limited modulated output signal from an inputted binary data signal, comprising:
(a) look-up table memory means having a multiplicity of sets of digital component waveform sample values stored therein;
(b) means for retrieving digital component waveform sample values from said memory means in succession; and
(c) means for forming successive digital samples of said band-limited modulated output signal by summing a predetermined number of successively retrieved component waveform sample values retrieved from said memory means and then summing the next said predetermined number of successively retrieved component waveform sample values retrieved from said memory means.

11. The modulator apparatus as defined in claim 10, wherein said predetermined number equals three.

12. A digitally implemented modulator apparatus for generating a band-limited modulated output signal from an inputted binary data signal, comprising:
(a) look-up table memory means having a multiplicity of sets of digital component waveform sample values stored therein;
(b) means for forming a digital sample of said band-limited modulated output signal by summing sample values retrieved from said memory means; and
(c) means for retrieving first, second and third sample values from said memory means in dependence respectively on the binary values of first, second and third consecutive sets of data bits inputted during first, second and third baud intervals and in dependence on the number of samples which have been output since the start of said third baud interval,
wherein said forming means forms said digital sample of said band-limited modulated output signal by summing said retrieved first, second and third sample values.

13. The modulator apparatus as defined in claim 12, further comprising digital-to-analog conversion means for converting said sum to an analog signal.

14. A digitally implemented modulator apparatus for generating a band-limited modulated output signal from an inputted train of binary data bits, n data bits being input per baud interval, comprising:
(a) processing means for generating a digital sample of said band-limited modulated output signal;
(b) memory means having a multiplicity of sets of digital component waveform sample values stored therein, said memory means being coupled to said processing means;
(c) means for coupling said inputted train of binary data bits to said processing means; and
(d) means for converting said digital sample from said processing means into an analog sample of said band-limited modulated output signal,
wherein said processing means comprises addressing means for forming m addresses in dependence respectively on the binary values of the data bits in m consecutive sets of data bits and the number of digital samples which have been output by said processing means since the start of the pending baud interval, each set comprising n bits, reading means for retrieving the sample values stored in said memory means at said m addresses, and summing means for summing said m retrieved sample values to form said digital sample.

15. The modulator apparatus as defined in claim 14, wherein said processing means and said memory means are incorporated in a microprocessor.

16. The modulator apparatus as defined in claim 14, further comprising:
(e) digital-to-analog conversion means for converting said digital samples of said band-limited modulated output signal to an analog waveform; and
(f) means for coupling said outputted digital samples to said digital-to-analog conversion means.

* * * * *